Nov. 19, 1946.   A. FRIEDMAN ET AL   2,411,257
ELECTRIC PLANER
Filed April 14, 1943   5 Sheets-Sheet 1
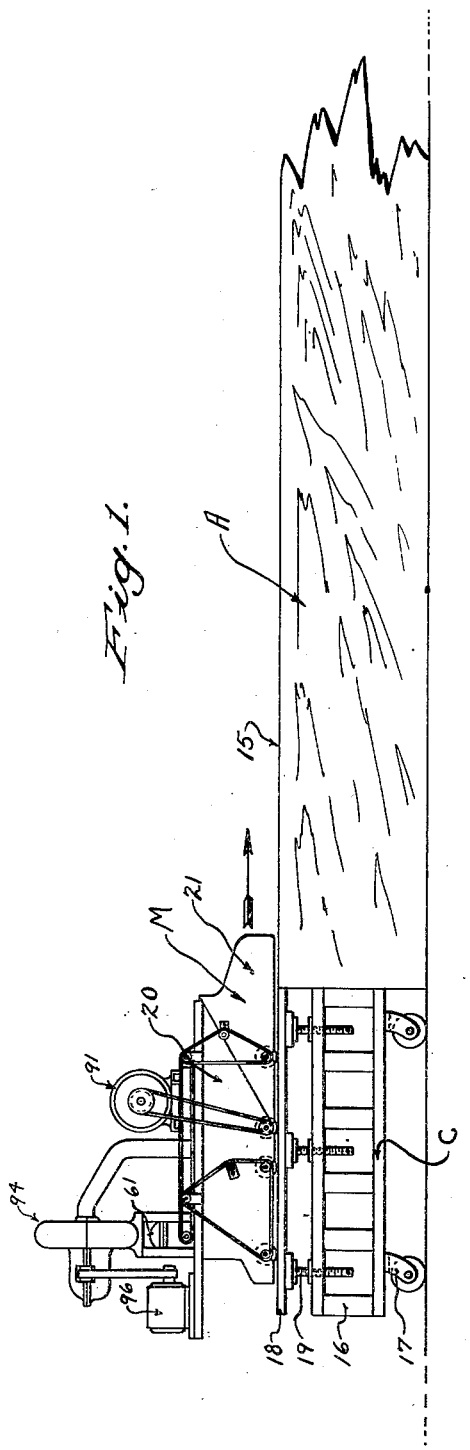
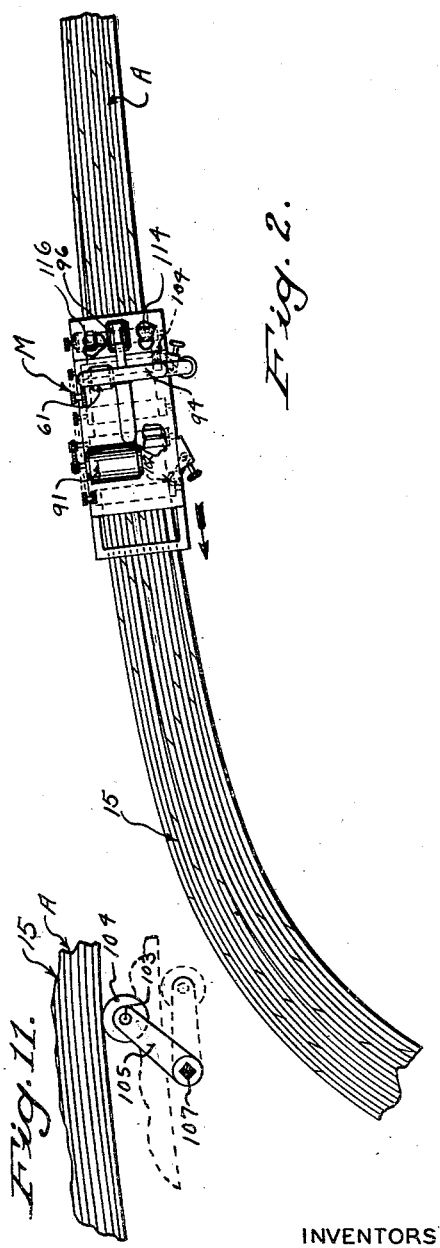
INVENTORS
A. FRIEDMAN
PETER THOMPSON
BY
ATTORNEYS

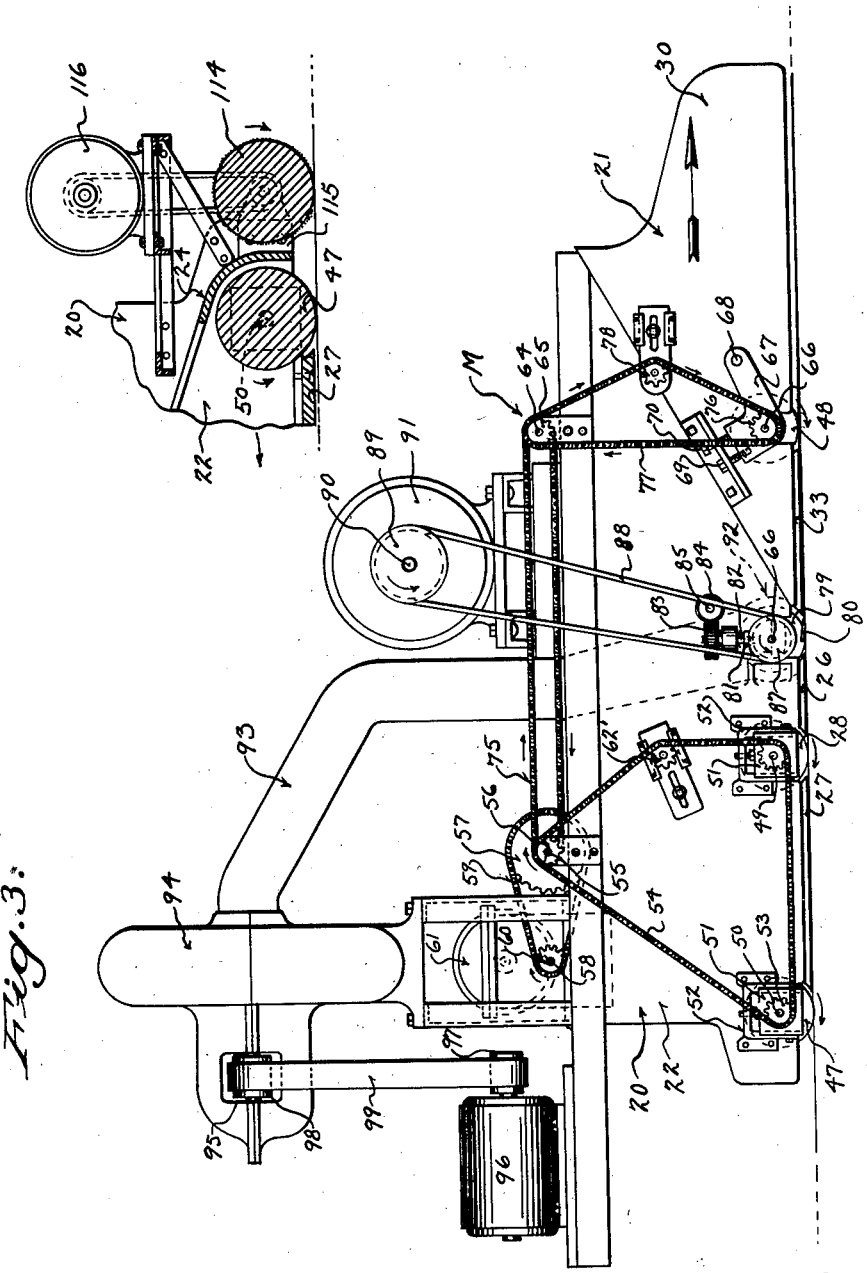

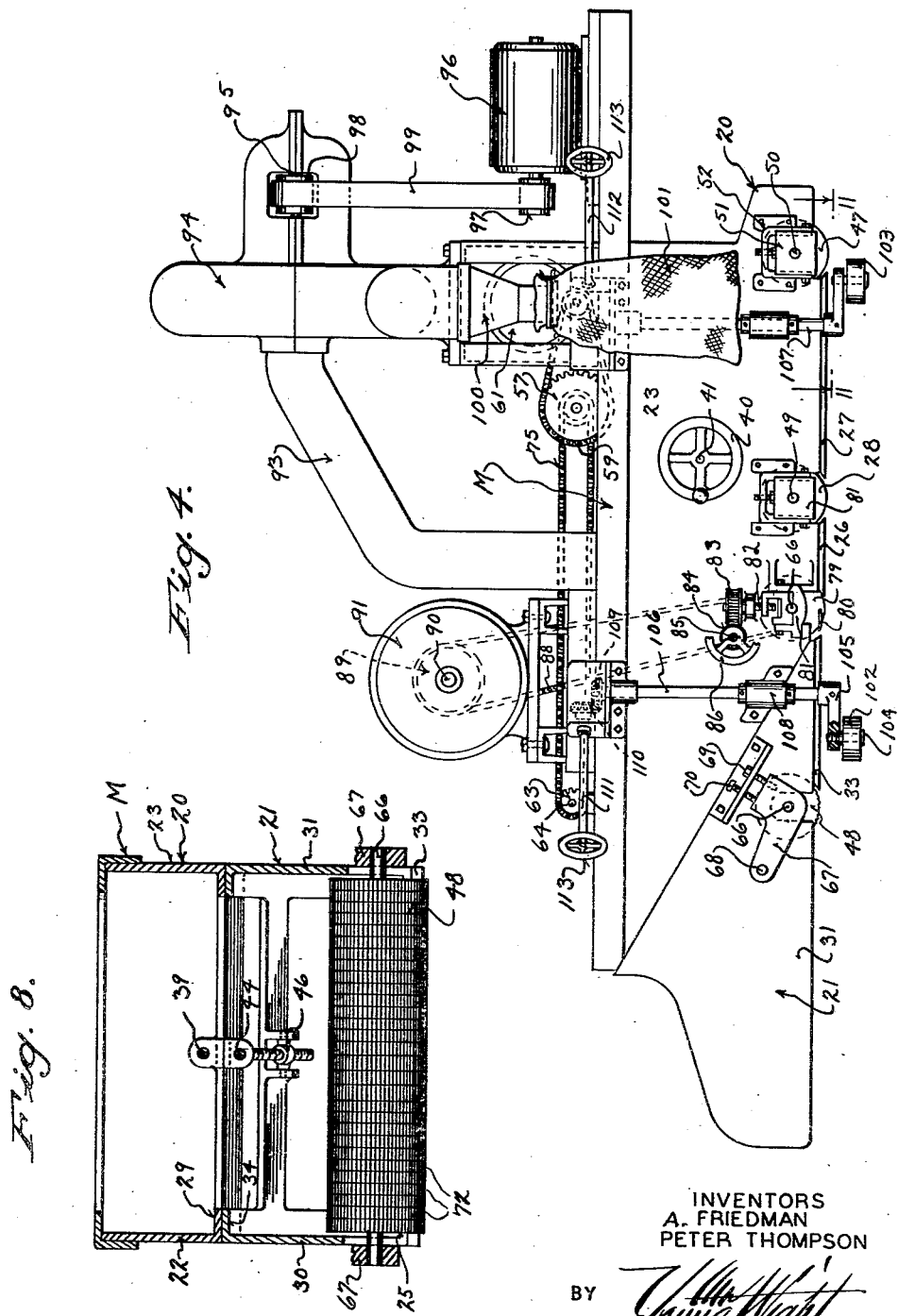

Nov. 19, 1946.    A. FRIEDMAN ET AL    2,411,257
ELECTRIC PLANER
Filed April 14, 1943    5 Sheets-Sheet 4
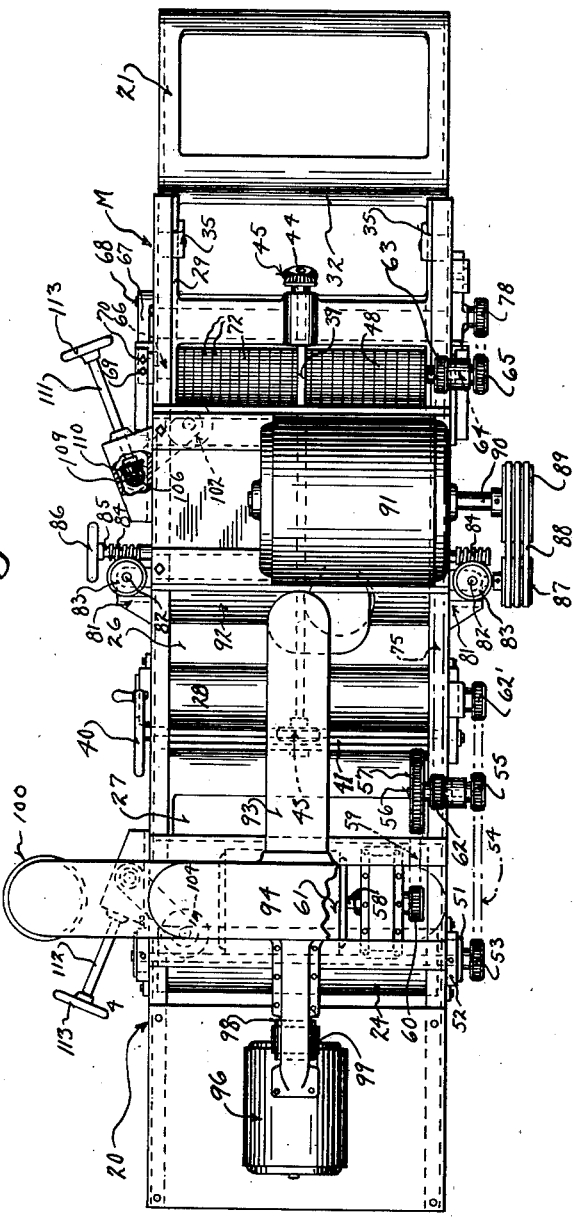
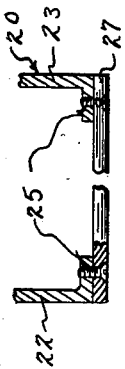
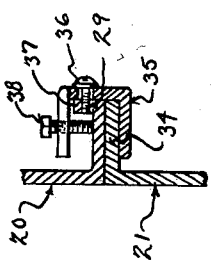
INVENTORS
A. FRIEDMAN
PETER THOMPSON
BY
ATTORNEYS

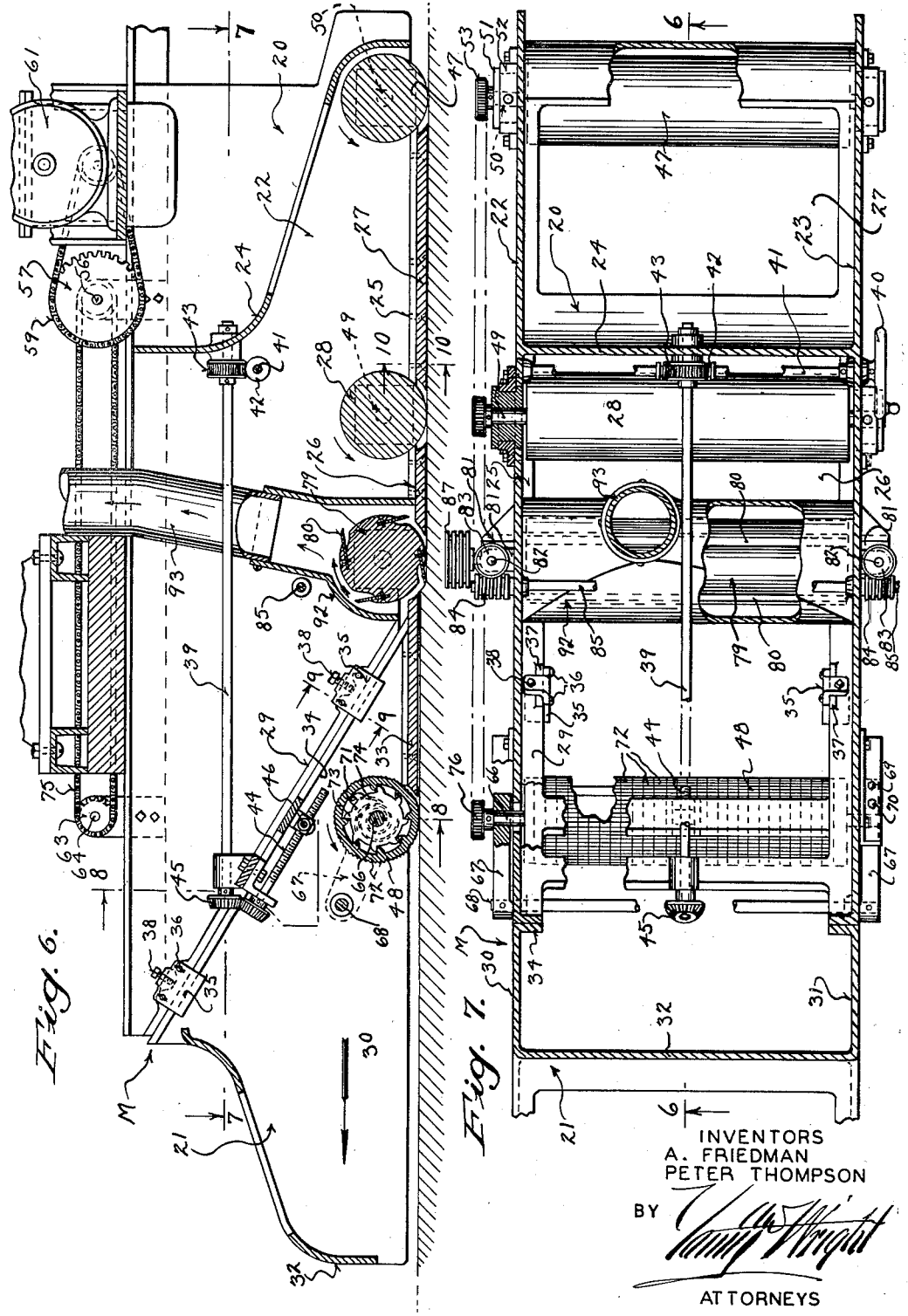

Patented Nov. 19, 1946

2,411,257

UNITED STATES PATENT OFFICE 2,411,257

ELECTRIC PLANER

Abraham Friedman and Peter Thompson, Peshtigo, Wis., assignors to Unit Structures, Inc., Peshtigo, Wis.

Application April 14, 1943, Serial No. 482,962

1 Claim. (Cl. 144—117)

This invention appertains to wood working machinery and more particularly to a novel planer for large structural units such as wood beams and arches.

In the forming of large arches and beams from glued boards (see Patent #2,172,093, issued September 5, 1939) the edges of the boards protrude different distances from the face of the beam or arch and great difficulty is experienced in properly planing and smoothing these edges to form the finished structural unit. Where an attempt is made to plane the units by hand, a great deal of time and labor is consumed.

It is therefore, one of the primary objects of the invention to provide an automatic planing machine for traveling over the face of the beam from one end thereof to the other for effectively planing the full width of the beam during the travel of the machine.

Another salient object of the invention is to provide a self-propelled planing machine adapted to travel over the face of the beam by driving rollers rotatably mounted on the frame of the machine, with a planing cylinder on the frame mounted between said driving rollers.

A further object of the invention is the provision of a leading driving roller comprising a plurality of independently movable discs, whereby said roller will conform itself to the boards forming the beam during the travel of the machine over said beam.

A further important object of the invention is the provision of guide rollers on the frame of the machine for engaging the side of the arch or beam on the inside curve thereof for effectively guiding the machine during its travel over the arch.

A still further object of this invention is the provision of means for adjusting the planing cylinder relative to the face of the arch or beam and for carrying the cut material away from the planing cylinder and the machine.

A still further important object of the invention is the provision of a mobile carrier for the planing machine, whereby the machine can be readily placed on a beam and received from the beam after the planing operation.

A still further object of the invention is to provide an adjustable table on said mobile carrier, whereby the planing machine can be raised or lowered on said carrier to the correct height of the beam or arch.

A still further object of the invention is the provision of a sanding roller on the machine arranged in rear of the planing cylinder for effectively giving a finished surface to the beam or arch, where such is needed.

With these and other objects in view, the invention consists in the novel construction, arrangement and formation of parts, as will be hereinafter more specifically described, claimed and illustrated in the accompanying drawings, in which drawings:

Figure 1 is a side, elevational view of a diagrammatic nature showing the novel planing machine being moved on to an arch from its mobile carrier.

Figure 2 is a top, plan view of a diagrammatic nature showing the planing machine traveling over the face of an arch.

Figure 3 is a side, elevational view of the novel planing machine.

Figure 4 is a side, elevational view of the planing machine showing the opposite side thereof from Figure 3.

Figure 5 is a top, plan view of the improved planing machine.

Figure 6 is a fragmentary, longitudinal, sectional view through the planing machine taken on the line 6—6 of Figure 7 looking in the direction of the arrows.

Figure 7 is a horizontal, sectional view through the planing machine taken on the line 7—7 of Figure 6 looking in the direction of the arrows.

Figure 8 is a transverse, sectional view through the machine taken on the line 8—8 of Figure 6 looking in the direction of the arrows.

Figure 9 is an enlarged fragmentary, detail, sectional view taken on the line 9—9 of Figure 6 looking in the direction of the arrows, illustrating the sliding connection between the main frame of the machine and the sliding shoe for regulating the depth of the cut of the planing cylinder.

Figure 10 is a fragmentary, detail, transverse, sectional view taken on the line 10—10 of Figure 6 looking in the direction of the arrows showing the connection of the bed plate with the side walls of the frame.

Figure 11 is a detail, horizontal, sectional view taken on the line 11—11 of Figure 4 looking in the direction of the arrows illustrating one of the guide rollers for engaging the side of the beam.

Figure 12 is a fragmentary, longitudinal, sectional view showing the use of a sanding roller with the machine.

Referring to the drawings in detail, wherein similar reference characters designate corresponding parts throughout the several views, the letter M generally indicates the novel planing machine and C the mobile carrier therefor for placing the machine on an arch A and for receiving the planing machine from an arch.

The arch A is of the type formed from a series of glued boards 15 as shown in Patent #2,172,093 heretofore mentioned. Usually the boards 15, forming a part of the arch protrude unequal distances from the face of the beam and difficulty is encountered in quickly and accurately planing the faces of the arch and the machine M is utilized for planing the faces of the arch and overcoming this difficulty.

Due to the great weight of the machine M, we provide the mobile carrier C for transporting the machine M to an arch or beam and for receiving the machine from the arch or beam after the machine has completed its work. Obviously, one or more mobile carriers C can be provided.

As illustrated, the mobile carrier C includes a chassis 16 mounted upon caster wheels 17. The chassis supports a table 18 for the machine M and this table can be raised and lowered on the chassis, such as by the use of jack screws 19. By providing the table 18, the machine M can be accurately raised and lowered to the exact height of the arch or beam, which facilitates the placing of the machine on the arch or beam and for receiving the machine from the arch or beam.

The machine M comprises a main frame 20 and an adjustable leading shoe 21 for regulating the depth of the cut, as will be later set forth.

The main frame 20 can be constructed in various manners and as illustrated the same includes spaced parallel side plates 22 and 23 connected and braced together. These plates are also connected by a rear wall 24. The lower edges of the side walls have formed thereon inwardly extending flanges 25 to which are secured smooth bed plates 26 and 27. These bed plates are spaced for receiving the intermediate driving roller 28, which will also be later more fully described. The forward end of the side walls 22 and 23 are inclined upwardly and forwardly and these inclined edges are also provided with inturned flanges 29.

The front adjustable shoe 21 is fitted underneath said upwardly and forwardly inclined front edges of the frame and this shoe includes spaced side walls 30 and 31, which are connected together and braced in any desired way. The forward edges of the walls 30 and 31 are connected by a front wall 32 and the lower edges of the side walls at the rear thereof are connected by a smooth bed plate 33 which is arranged in front of and in spaced relation to the bed plate 26. The side walls 30 and 31 of the adjustable shoe also carry inclined flanges 34 on their upper edges which slidably engage the flanges 29 of the frame. Brackets 35 are employed for slidably connecting the adjustable shoe 21 with the main frame and these brackets 35 are of a U shape in side elevation, see Figure 9, and embrace the flanges 29 and 34. Screws 36 extend through slots in the brackets 35 and are threaded into ribs 37 carried by the flanges 29. Set screws are also carried by the brackets for adjustably engaging the flanges 29. By this construction the brackets can be adjusted relative to the flanges to engage the same with the proper and desired friction.

The adjustable shoe can be slid up and down on the main frame in any preferred way so as to regulate the position of its bed plate 33 relative to the work and to the bed plates 26 and 27 carried by the main frame. As illustrated, a main longitudinally extending adjusting shaft 39 is rotatably mounted in a suitable bearing carried by the main frame and this shaft can be turned manually through the provision of a hand wheel 40. This hand wheel 40 is rigidly secured to a cross shaft 41 which is rotatably mounted in bearings carried by the side walls 22 and 23 of the main frame. The shaft 41 is operatively connected to the shaft 39 by a worm 42 and a worm wheel 43. The forward end of the shaft 39 is operatively connected to an adjusting screw shaft 44 through the medium of intermeshing bevelled gears 45. This adjusting screw shaft 44 is also carried by bearings on the main frame, but the shaft is received within a nut 46 carried by the shoe 21. Hence, by turning the shaft 39 through the medium of the hand wheel 40, the screw shaft 44 will be rotated and the shoe being connected to said shaft by the nut will be slid up or down according to the rotation of said screw shaft 44.

The main frame 20 carries a rear drive roller 47 which is arranged directly in back of the bed plate 27 and the adjustable shoe 21 carries a front drive roller 48 which is arranged directly in front of the bed plate 32. This drive roller 48 is of special construction, so as to effectively engage the work, and this roller will be later described in detail. It is to be noted that the intermediate drive roller 28 and the rear drive roller 47, both of which are carried by the main frame, are rigidly mounted upon axle shafts 49 and 50 respectively and the terminals of these shafts are rotatably supported in bearing blocks 51 which are slidably mounted for vertical movement within guide brackets 52 carried by the side walls or plates 22 and 23 of the main frame. The ends of the axle shafts 49 and 50 on one side are provided with sprocket wheels 53 and these sprocket wheels have trained thereabout a drive sprocket wheel 55 which is keyed or otherwise secured to a counter shaft 56 rotatably mounted upon the frame. The counter shaft has keyed or otherwise secured thereto a relatively large sprocket wheel 57 which is in line with a relatively small sprocket wheel 58 and the sprocket wheels 57 and 58 are operatively connected together by a sprocket chain 59. The sprocket wheel 58 is keyed or otherwise secured to a drive shaft 60 and this shaft is driven, through the use of a suitable gearing (not shown), from an electric motor 61. An adjustable idle sprocket wheel 62' can be provided for taking up any slack in the sprocket chain 54 and the adjustable idle sprocket wheel 62' acts as a chain tightener.

The front drive roller 48 is also driven from the counter shaft 56 and this counter shaft has keyed or otherwise secured thereto a sprocket wheel 62, which is in line with a sprocket wheel 63, keyed or otherwise secured to a jack shaft 64. The jack shaft 64 has also secured thereon a sprocket wheel 65 and it is to be noted that the jack shaft is above the drive roller 48.

This drive roller 48 includes an axle shaft 66, the terminals of which are rotatably mounted in swinging rock arms 67. The upper ends of the rock arms are fastened to a transversely extending rock shaft 68 and set screws 69 and 70 are provided for adjusting the position of the arms 67 whereby to raise or lower the front drive roller 48. Keyed to the axle shaft 66 of the drive roller are a plurality of independent drive discs 71 and each of the discs 71 has mounted thereon a serrated drive ring 72. The discs 71 are operatively connected to the rings 72 by interengaging teeth 73. A spring connection 74 is provided between each disc 71 and each ring 72 so as to normally hold the rings 72 centered on their discs. By this construction and arrangement, as the machine travels forwardly over the face of the arch the rings, engaging the individual boards making up the arch, can raise or lower to conform to the configuration of the face of the arch.

The front drive roller 48 is driven from the motor 61 and by referring to Figures 3, 4, and 5 it can be seen that the sprocket wheels 62 and 63 are operatively connected together by means of a sprocket chain 75. The axle shaft 66 of the drive roller 48 has keyed or otherwise secured thereto a sprocket wheel 76 and a sprocket chain 77 is trained about this sprocket wheel and a sprocket wheel 65 on the stub shaft 64. An adjustable idle sprocket wheel 78 is employed for tightening the chain 77. Hence, from the foregoing description, it can be seen that all of the drive rollers are operated from a single motor.

Extending transversely across the machine is a planing cylinder 79 and this cylinder is disposed between the bed plates 26 and 33. As is clearly illustrated in the drawings, the planing cylinder is disposed in rear of the front driving roller 48 but in front of the intermediate and rear drive rollers 28 and 47. The planing cylinder is rotatably carried by the main frame of the machine and this cylinder can be of any preferred character. As illustrated, the same includes a plurality of longitudinally extending planing knives 80 which can be adjustably carried by the cylindrical body of the planing cylinder. The ends of the body carry stub axles which are rotatably mounted in bearings 81 and these bearings can be adjustably mounted on the side plates 22 and 23 of the main frame of the machine whereby the planing cylinder can be raised or lowered. As illustrated, the slide bearings 81 are engaged by screw shafts 82 and these adjusting screws are provided with worm wheels 83. The worm wheels 83 are engaged by worms 84 with a worm wheel shaft 85. This shaft is rotatably mounted in bearings carried by the front of the machine and the shaft can be provided with a hand wheel 86 whereby said shaft can be conveniently turned for operating the shaft 82.

The outer end of one stub shaft of the planing cylinder has keyed or otherwise secured thereto a pulley wheel 87 and this pulley wheel is driven by a pulley belt 88, which is also trained about a pulley wheel 89 keyed or otherwise secured to the armature shaft 90 of an electric drive motor 91. This drive motor 91 is firmly mounted upon the top of the frame of the machine. Hence, the planing cylinder 79 is operated independently from the drive rollers.

As the machine advances over the arch or beam, it is essential that the material removed from the face of the arch or beam be carried away from the planing cylinder and the machine. In order to carry these pieces away, the cylinder is provided with a suction hood 92 and this hood has communicating with the top thereof a suction pipe 93. The suction pipe communicates with the intake of a suction fan 94 which is also firmly mounted upon the top of the main frame of the machine. The drive shaft 95 of the suction fan is operated from an electric motor 96 which is also carried by the top of the main frame. As is also clearly shown in the drawings, the armature shaft of the motor can be provided with a pulley wheel 97 and the drive shaft of the suction fan can be provided with a pulley wheel 98. These pulley wheels 97 and 98 can be operatively connected together by a pulley belt 99. The outlet of the suction fan has communicating therewith a depending outlet pipe 100 which leads to one side of the machine. The material which is removed from the arch can be either blown on to the floor of the shop or can be caught in a bag 101 which is detachably connected to the outlet exhaust or outlet pipe 100.

In operation of the machine, as the various laminations of the beam or arch have been secured together and the arch or beam is removed from the forms, the machine M is wheeled to the arch by the mobile carrier C and the table 18 of the carrier is adjusted to the correct height. The machine is now rolled partially on the arch A until the planing cylinder reaches the front edge of the arch. At this time the front driving roller 48 will be pulling on the upper face of the arch or beam. The various motors are now started and the machine is guided onto the beam and travels onto the beam and along the length of the beam under its own power by said driving rollers 48, 28, and 47. The guide rollers 102 and 103, which form an important part of the machine and which will be later described in detail, are adjusted to fit against the inner side face of the arch (see Figure 2) and these rollers effectively guide the machine in its travel over the face of the beam and during the travel of the machine, the upper face thereof is efficiently planed. Obviously the shoe 21 is adjusted so that the planing cylinder 79 will cut the desired depth.

When the machine reaches the end of the arch or beam a mobile carrier C is placed at such end to receive the same and when the planing cylinder reaches the mobile carrier, the motor 91 therefor can be cut off and the machine will then travel on to said mobile carrier. The motor 61 for the drive rollers 28, 47 and 48 can be cut off when the machine travels on to the carrier.

Particular attention is now invited to the guide rollers 102 and 103 and these guide rollers are clearly illustrated in Figures 4 and 11. The guide rollers 102 and 103 are rotatably mounted on depending spindles 104 carried by the outer ends of crank arms 105. These crank arms are keyed or otherwise secured at their inner ends to the lower terminals of adjusting shafts 106 and 107. The adjusting shafts 106 and 107 are rotatably mounted in bearings 108 carried by the side plate 23 of the main frame 20 of the machine. The upper ends of the shafts 106 and 107 are provided respectively with bevelled gears 109 and each of the bevelled gears have meshing therewith bevelled gears 110 which are keyed respectively to manipulating shafts 111 and 112. These shafts are mounted on the main frame of the machine and the outer end of each shaft has connected therewith a hand wheel 113 to facilitate the operation thereof. Obviously, by turning the wheels 113, the guide wheels 103 and 104 can be individually adjusted.

In certain instances it may be desirable to not only plane the top of the arch or beam, but to also sand the top of the beam. In Figure 12 we have shown a modification of our invention in which a sanding roller 114 is employed. The sanding roller 114 is rotatably mounted on a suitable frame 115 which is connected to the rear of the main frame 20. An independent drive motor 116 is provided for actuating said sanding roller 114.

Various changes in details may be made without departing from the spirit or the scope of our invention, but what we claim as new is:

A self-propelled machine for planing the upper face of a large beam or arch comprising a frame, a power driven planing cylinder extending transversely across said frame for engaging the upper face of an arch or beam, power driven propelling rollers extending transversely of the frame of the machine for engaging the upper face of the beam, spaced crank shafts carried by one side of the frame, cranks on the lower ends of said shafts, guide rollers carried by said cranks for engaging the side face of an arch or beam, and independent means for turning each of said shafts.

ABRAHAM FRIEDMAN.
PETER THOMPSON.